Figure 1:
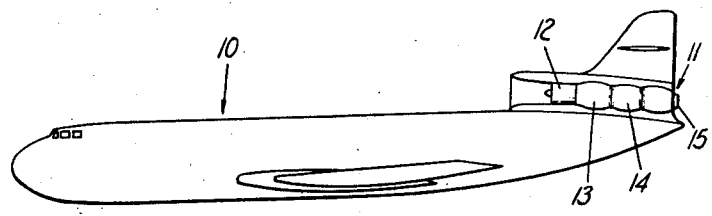
Figure 3:
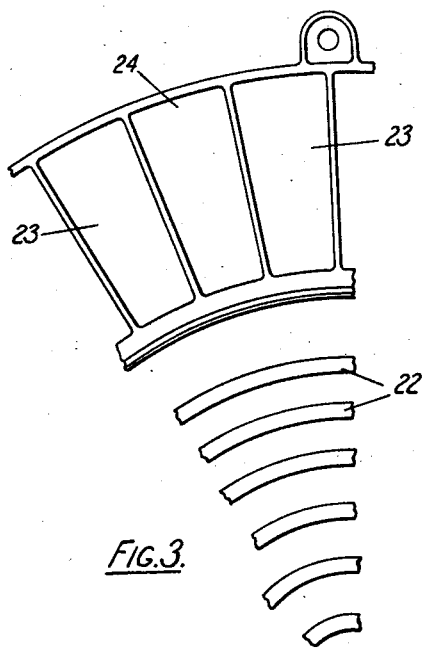
Figure 4:
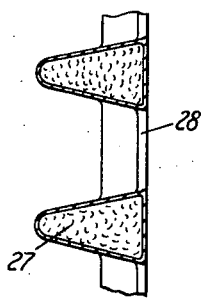
Figure 5:
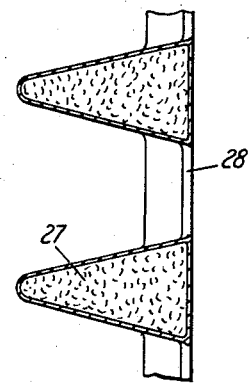
Figure 6:
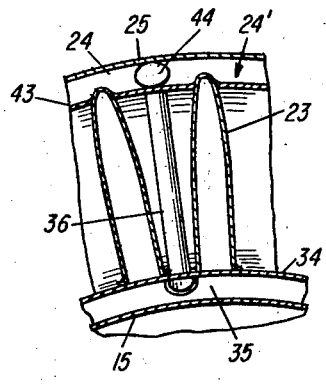

Sept. 29, 1964  T. A. OLDFIELD  3,150,484
GAS TURBINE BY-PASS ENGINE
Filed June 29, 1961  3 Sheets-Sheet 1

Inventor
Thomas Alfred Oldfield
By
Cushman, Darby & Cushman
Attorneys

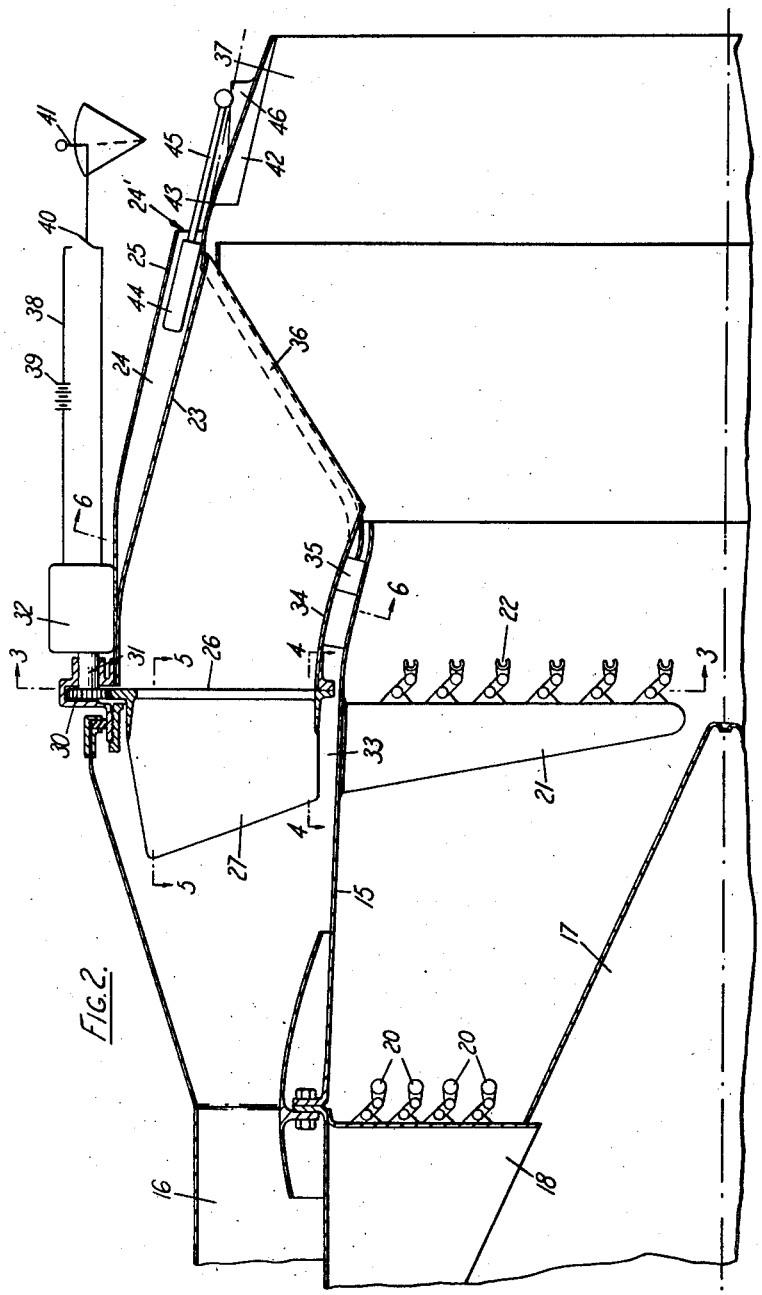

Sept. 29, 1964  T. A. OLDFIELD  3,150,484
GAS TURBINE BY-PASS ENGINE
Filed June 29, 1961  3 Sheets-Sheet 3

Inventor
Thomas Alfred Oldfield
By
Cushman, Darby & Cushman
Attorneys ent Office 3,150,484
Patented Sept. 29, 1964

3,150,484
GAS TURBINE BY-PASS ENGINE
Thomas Alfred Oldfield, Allestree, England, assignor to Rolls-Royce Limited, Derby, Derbyshire, England, a company of Great Britain
Filed June 29, 1961, Ser. No. 120,720
Claims priority, application Great Britain, Aug. 2, 1960, 26,778/60
7 Claims. (Cl. 60—35.6)

This invention concerns a gas turbine by-pass engine which is provided with reheat combustion apparatus for reheating the turbine exhaust gases flowing through the engine jet pipe.

When the reheat combustion apparatus of such an engine is brought into operation, the burning of the reheat fuel causes an increase in the static pressure and temperature and hence the volume of the gases flowing through the jet pipe. In order to allow for this increase, the downstream end of the jet pipe may be provided with a variable area propulsion nozzle whose effective area is substantially increased whenever the reheat combustion apparatus is brought into operation. Such a nozzle, however, is heavy and must be so made as to withstand the high temperatures and pressures of the reheated gases. It is therefore the object of the present invention to provide a gas turbine engine having reheat combustion apparatus in which it is unnecessary to provide such a nozzle or in which, if a variable area nozzle is provided, the extent to which its effective area must be variable does not need to be as substantial as hitherto.

According therefore to the present invention, there is provided a gas turbine by-pass engine comprising a jet pipe, reheat combustion apparatus mounted within the jet pipe for reheating the turbine exhaust gases flowing therethrough, a by-pass passage mounted about the jet pipe and arranged to receive by-pass air, a valve controlling flow of by-pass air from said by-pass passage, ducting arranged on the downstream side of the valve and through which the by-pass air may flow into the jet pipe for mixing therein with the turbine exhaust gases, and means for moving said valve between at least two positions in the first of which at least the greater part of the by-pass air flows through said ducting and into the jet pipe and in the second of which it is prevented from so doing.

Means may be provided which set the valve in the first position whenever the reheat combustion apparatus is out of use and which set the valve in, or which move the valve towards, the second position whenever the reheat combustion apparatus is in use.

Preferably the engine is provided with an annular passage which is open at its downstream end and which surrounds the jet pipe, the annular passage constituting a downstream continuation of the by-pass passage, the valve, when in the second position, permitting at least the greater part of the by-pass air to flow from the by-pass passage to the annular passage.

Preferably the ducting comprises a series of angularly spaced apart stub pipes which pass through said annular passage.

The valve may comprise an annular valve disc extending transversely across the by-pass passage and having a series of angularly spaced apart apertures which may be brought into and out of registration with the stub pipes. Preferably the disc carries, between each adjacent pair of apertures therein, a baffle member for deflecting the air through said apertures.

Means may be provided for passing a minor proportion of the by-pass air from the by-pass passage to the internal wall of the jet pipe for cooling the latter. The said means preferably comprises a conduit which by-passes the valve.

Preferably the said ducting communicates with the jet pipe on the downstream side of the reheat combustion apparatus.

Figure 7:
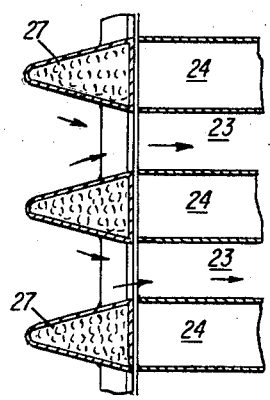
Figure 8:
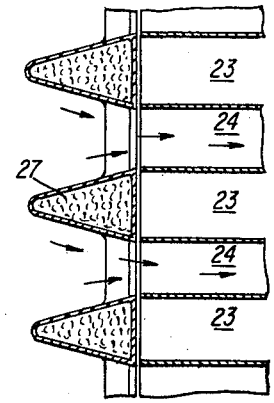

The invention is illustrated, merely by way of example, in the accompanying drawings, in which:
FIGURE 1 is a side view of an aircraft provided with a gas turbine by-pass engine according to the present invention,
FIGURE 2 is a section through part of the engine shown in FIGURE 1,
FIGURES 3–6 are sections taken respectively on the lines 3—3, 4—4, 5—5, and 6—6 of FIGURE 2, and
FIGURES 7 and 8 are views similar to FIGURE 5 but illustrating, respectively, the valve in the by-pass passage in a first position where the by-pass air is directed into the stub pipes for transferring into the jet pipe and in a second position where the by-pass air is directed into the continuation of the by-pass passage.

Referring first to FIGURE 1, a jet aircraft 10 is provided with forward propulsion gas turbine by-pass engines 11. Each engine 11 comprises in flow series one or more compressors 12, combustion equipment 13, and one or more turbines 14, the turbine exhaust gases passing into a jet pipe 15.

Part of the air which has been compressed in the compressor or compressors 12 is supplied (by means not shown) to a by-pass passage 16 (FIG. 2) so as to by-pass the combustion equipment 13 and turbine or turbines 14. The by-pass passage 16 is an annular passage which surounds the jet pipe 15.

Mounted within the jet pipe 15 is a substantially conical baffle member 17 which is arranged to permit the expansion of the gases which have passed through the turbine or turbines 14. The baffle member 17 is supported from the jet pipe 15 by angularly spaced apart radial struts 18.

The struts 18 collectively carry four concentric annular pipes 20 which are supplied with reheat fuel (by means not shown) and which are provided with a series of angularly spaced apart holes which face downstream and through which the reheat fuel is injected into the turbine exhaust gases.

Mounted within the jet pipe 15 adjacent the downstream end of the baffle member 17 are a plurality of angularly spaced apart radial struts 21. The struts 21 collectively carry six concentric gutters 22 which are C-shaped in cross section and which have downstream-facing limbs. The reheat fuel is, in operation, carried downstream by the turbine exhaust gases and is ignited (by means not shown) in the region of the gutters 22 so as to be burnt in the sheltered zones provided by the gutters.

A plurality (e.g. twenty) of angularly spaced apart elongated stub pipes 23 are provided to permit by-pass air to flow from the by-pass passage 16 to the jet pipe 15, the stub pipes 23 extending into the latter.

The stub pipes 23 extend across an annular passage 24 which surrounds the jet pipe 15 and which is defined between the latter and a casing 25. The annular passage 24 constitutes a downstream extension of the by-pass passage 16 and is open only along an annular area 24′ of its downstream end, between the casing 25 and the wall of the nozzle 37, the remainder of its downstream end bewteen the downstream ends of the stub pipes 23 being closed.

Rotatably mounted within the downstream end of the by-pass passage 16, so as to be arranged at the upstream ends of the stub pipes 23, is an annular valve disc 26. The latter is provided with a plurality of angularly spaced apart baffles 27 which taper radially inwardly.

The disc 26, between each adjacent pair of baffles 27, is provided with an aperture 28, the baffles 27 directing the by-pass air through the apertures 28. By rotating the disc 26, the apertures 28 may be brought into registration with stub pipes 23 and out of registration with the upstream ends of the annular passage 24 as shown in FIGURE 7, or into registration with the upstream ends of the annular passage 24 and out of registration with the stub pipes 23 as shown in FIGURE 8.

The outer circumference of the disc 26 is provided with gear teeth which mesh with a pinion 30. The latter is mounted on a shaft 31 of an electric motor 32. The motor 32 is adapted to rotate the disc 26 through an angle of, say, 9° either way from a mean position so as to bring the apertures 28 into and out of registration with the stub pipes 23, and upstream ends of the annular passage 24, respectively.

The motor 32 is shown, merely for purposes of illustration, as being connected in a circuit 38 which includes a battery 39 (or other source of electrical energy) and a switch 40, the switch 40 being connected to the pilot's throttle lever 41 so that when the latter is moved to select reheat the circuit 38 is completed and the motor 32 is energized. In practice, however, the switch 40 would be arranged to contact one or other of two contact members which are respectively disposed in two circuits, one of the circuits being arranged to effect rotation of the motor 32 in one angular sense and the other circuit being arranged to effect rotation of the motor 32 in the opposite angular sense. Means, moreover, would in practice be provided to prevent the motor 32 from rotating more than the desired amount in either angular sense.

The disc 26 is separated from the jet pipe 15 by an axially extending annular space 33 while the stub pipes 23 are carried by a cylindrical member 34 which is separated from the jet pipe 15 by an axially extending annular space 35. The spaces 33, 35 intercommunicate and the downstream end of the space 35 communicates by way of a pipe 36 with the internal wall of a nozzle 37 at the downstream end of the jet pipe 15. The spaces 33, 35 thus by-pass the valve disc 26 and serve to supply a small proportion of the by-pass air to the said internal wall so as to effect cooling of the latter.

A flap member 42, which is pivoted at 43, forms part of the nozzle 37. A pneumatically or hydraulically operated ram 44 has a piston rod 45 which is connected to a lug or the like 46 secured to the flap member 42. Thus the flap member 42 may be moved between the full line and dotted line positions shown in FIGURE 2 by means of the ram 44.

In operation, when a gas turbine engine 11 is being used without reheating of the turbine exhaust gases, the valve disc 26 is arranged as shown in FIGURE 7 in the position in which all the by-pass air (with the exception of the small proportion which flows through the spaces 33, 35) passes through the stub pipes 23 and into the jet pipe 15 so as to mix with the turbine exhaust gases therein.

When, however, a gas turbine engine 11 is being used with reheating of the turbine exhaust gases, the valve disc 26 is arranged as shown in FIGURE 8 in the position in which all the by-pass air (with the exception of the said small proportion thereof) passes through the annular passage 24 so as to be discharge in an axial direction through the downstream end 24' thereof.

When the maximum degree of reheating of the turbine exhaust gases is required, the ram 44 is caused to move the flap member 42 to the dotted line position.

The energization of the motor 32 so as to rotate the valve disc 26 instead of being effected, as shown, by the pilot whenever the reheat combustion apparatus is to be brought into or out of operation, may be energized by automatic means. For example the latter could sense the temperature or pressure in the jet pipe 15 or could be responsive to a supply of fuel to the pipes 20.

If desired, the motor 32, instead of being arranged to rotate the valve disc 26 only into the two limiting positions in which the apertures 28 are brought fully into or out of registration with the stub pipes 23, may also be arranged to rotate the disc 26 into a number of intermediate positions, whereby the degree of reheat employed can be varied between a minimum and a maximum according to the amount of by-pass air flowing into the nozzle 37.

The flap member 42 is a wholly optional feature and if desired may be totally dispensed with so that the effective area of the nozzle 37 cannot be altered.

It will be appreciated that, by reason of the construction shown in the drawings, the static pressure in the jet pipe 15 will not alter substantially when the reheat combustion apparatus is in operation because the greater part of the by-pass air will, at this time, be passed to the annular passage 24. It is therefore unnecessary to provide the jet pipe 15 with a variable area propulsion nozzle.

It is found in practice that it is necessary to space the gutters 22 from the downstream end of the jet pipe 15 by a distance not less than 1½ times the diameter of the jet pipe. The construction shown in the drawings permits the diameter of the jet pipe to be reduced since the jet pipe does not have both by-pass air and reheated gases flowing therethrough simultaneously. Hence the said construction permits the length of the jet pipe 15 to be reduced.

Furthermore when the reheat combustion apparatus is brought into operation, no mixing of the by-pass air and turbine exhaust gases is necessary prior to reheating, and thus a mixing region need not be provided upstream of the reheat apparatus, whereby a further saving of length results.

I claim:

1. A gas turbine by-pass engine comprising a jet pipe, reheat combustion apparatus mounted within the jet pipe for reheating the turbine exhaust gases flowing therethrough, a by-pass passage mounted about the jet pipe and arranged to receive by-pass air, an annular passage which is open at its downstream end and which surrounds the jet pipe, the annular passage constituting a downstream continuation of the by-pass passage, a valve controlling flow of by-pass air from said by-pass passage, ducting arranged on the downstream side of the valve and having one end communicating with the interior of said by-pass passage and cooperating with said valve and another end communicating with the interior of said jet pipe, said ducting providing for the flow of by-pass air into the jet pipe for mixing therein with the turbine exhaust gases, means for moving said valve between at least two positions in the first of which at least the greater part of the by-pass air flows through said ducting and into the jet pipe and in the second of which at least the greater part of the by-pass air flows from the by-pass passage to the annular passage, and operating means which sets the valve in the first position whenever the reheat combustion apparatus is out of use and sets the valve in the second position whenever the reheat combustion apparatus is in use.

2. A gas turbine by-pass engine comprising a jet pipe, reheat combustion apparatus mounted within the jet pipe for reheating the turbine exhaust gases flowing therethrough, a by-pass passage mounted about the jet pipe and arranged to receive by-pass air, an annular passage which is open at its downstream end and which surrounds the jet pipe, the annular passage constituting a downstream continuation of the by-pass passage, a valve controlling flow of by-pass air from said by-pass passage, a series of angularly spaced apart stub pipes arranged on the downstream side of the valve and each of said stub pipes having one end communicating with the interior of said by-pass passage and cooperating with said valve and another end communicating with the interior of said jet pipe, said stub pipes providing for the flow of by-pass air into the jet pipe for mixing therein with the turbine exhaust gases, said stub pipes passing through the annular passage, means for moving said valve between at least two positions in the first of which at least the greater part of the by-pass air flows through said stub pipes into the jet pipe and in the second of which at least the greater part of the by-pass air flows from the by-pass passage to the annular passage, and operating means which sets the valve in the first position whenever the reheat combustion apparatus is out of use and sets the valve in the second position whenever the reheat combustion apparatus is in use.

3. A gas turbine by-pass engine comprising a jet pipe, reheat combustion apparatus mounted within the jet pipe for reheating the turbine exhaust gases flowing therethrough, a by-pass passage mounted about the jet pipe and arranged to receive by-pass air, an annular passage which is open at its downstream end and which surrounds the jet pipe, the annular passage constituting a downstream continuation of the by-pass passage, a valve controlling flow of by-pass air from said by-pass passage, a series of angularly spaced apart stub pipes arranged on the downstream side of the valve and each of said stub pipes having one end communicating with the interior of said by-pass passage and cooperating with said valve and another end communicating with the interior of said jet pipe, said stub pipes providing for the flow of by-pass air into the jet pipe for mixing therein with the turbine exhaust gases, said stub pipes passing through the annular passage, said valve comprising a rotatably mounted annular valve disc extending transversely across the by-pass passage and having a series of angularly spaced apart apertures which may be brought into and out of registration with the stub pipes, means for moving said valve between at least two positions in the first of which at least the greater part of the by-pass air flows through said stub pipes and into the jet pipe and in the second of which at least the greater part of the by-pass air flows from the by-pass passage to the annular passage and means which sets the valve in the first position whenever the reheat combustion apparatus is out of use and sets the valve in the second position whenever the reheat combustion apparatus is in use.

4. A gas turbine by-pass engine as claimed in claim 3 in which the disc carries, between each adjacent pair of apertures therein, a baffle member for deflecting the air through said aperture.

5. A gas turbine by-pass engine comprising a jet pipe, reheat combustion apparatus including fuel injection means and flame stabilizing means mounted within the jet pipe for reheating the turbine exhaust gases flowing therethrough, a by-pass passage mounted about the jet pipe and arranged to receive by-pass air, a valve controlling flow of by-pass air from said by-pass passage, ducting arranged on the downstream side of the valve and through which the by-pass air may flow into the jet pipe for mixing therein with the turbine exhaust gases, the said ducting communicating with the jet pipe on the downstream side of the reheat combustion apparatus, and means for moving said valve between at least two positions in the first of which all the by-pass air flows through said ducting and into the jet pipe and in the second of which none of the by-pass air flows through said ducting and into the jet pipe.

6. A gas turbine by-pass engine comprising: a jet pipe, reheat combustion apparatus mounted within said jet pipe for reheating turbine exhaust gases flowing therethrough, a by-pass passage mounted about said jet pipe and arranged to receive by-pass air, said by-pass passage having a discharge end for discharging by-pass air externally of the jet pipe, a valve controlling the flow of by-pass air through the by-pass passage and from the discharge end thereof, ducting arranged on the downstream side of said valve and having one end communicating with the interior of said by-pass passage and cooperating with said valve and another end communicating with the interior of said jet pipe, said ducting providing for the flow of by-pass air into the jet pipe for mixing therein with turbine exhaust gases, and means for moving the valve between at least two positions in the first of which all of the by-pass air flows through said ducting and into the jet pipe and in the second of which all of the by-pass air is discharged from the discharge end of the by-pass passage externally of the jet pipe with none of the by-pass air flowing through said ducting and into said jet pipe.

7. A gas turbine engine as claimed in claim 6 including operating means which sets said valve in said first position whenever the re-heat combustion apparatus is out of use and sets said valve in said second position whenever reheat combustion apparatus is in use.

References Cited in the file of this patent

UNITED STATES PATENTS

| 2,753,685 | Mattinson | July 10, 1956 |
| 2,857,740 | Hall et al. | Oct. 28, 1958 |
| 2,929,203 | Henning et al. | Mar. 22, 1960 |

FOREIGN PATENTS

| 1,086,315 | France | Aug. 11, 1954 |